(12) United States Patent
Moreno De Ayala et al.

(10) Patent No.: US 8,934,663 B2
(45) Date of Patent: Jan. 13, 2015

(54) DIGITAL WATERMARKING

(75) Inventors: Oscar Moreno De Ayala, Rio Pietas, PR (US); Anatol Zygmunt Tirkel, East Brighton (AU)

(73) Assignee: Optimark, L.L.C., San Juan, PR (US)

( * ) Notice: Subject to any disclaimer, the term of this patent is extended or adjusted under 35 U.S.C. 154(b) by 392 days.

(21) Appl. No.: 13/504,577

(22) PCT Filed: Aug. 4, 2010

(86) PCT No.: PCT/AU2010/000990
§ 371 (c)(1),
(2), (4) Date: Apr. 27, 2012

(87) PCT Pub. No.: WO2011/050390
PCT Pub. Date: May 5, 2011

(65) Prior Publication Data
US 2012/0213402 A1    Aug. 23, 2012

Related U.S. Application Data

(60) Provisional application No. 61/255,869, filed on Oct. 29, 2009.

(51) Int. Cl.
*G06K 9/00* (2006.01)
*H04N 1/32* (2006.01)
*G06T 1/00* (2006.01)

(52) U.S. Cl.
CPC ......... *H04N 1/32154* (2013.01); *H04N 1/3232* (2013.01); *H04N 1/32341* (2013.01); *H04N 1/32203* (2013.01); *G06T 1/0071* (2013.01)
USPC ....................................... 382/100

(58) Field of Classification Search
None
See application file for complete search history.

(56) References Cited

U.S. PATENT DOCUMENTS

| | | | |
|---|---|---|---|
| 6,356,363 B1 * | 3/2002 | Cooper et al. | 358/1.9 |
| 7,130,443 B1 * | 10/2006 | Werner et al. | 382/100 |
| 7,929,409 B2 * | 4/2011 | Chitrapu et al. | 370/208 |
| 8,480,110 B2 * | 7/2013 | Gorenstein et al. | 280/282 |
| 8,509,205 B2 * | 8/2013 | Jain et al. | 370/342 |
| 8,635,161 B2 * | 1/2014 | Vial | 705/51 |
| 2002/0184503 A1 * | 12/2002 | Kalker et al. | 713/176 |
| 2003/0142847 A1 * | 7/2003 | Rhoads | 382/100 |
| 2004/0028222 A1 * | 2/2004 | Sewell et al. | 380/28 |
| 2006/0133647 A1 * | 6/2006 | Werner et al. | 382/100 |
| 2006/0188129 A1 * | 8/2006 | Mayboroda et al. | 382/100 |

OTHER PUBLICATIONS

Moreno, O. et al.; Double periodic arrays with optimal correlation for applications in watermarking; Proceedings of the 2007 international conference on Sequences, subsequences, and consequences; pp. 82-94; 2007.*

Beard, J.K. et al.; Costas Array Generation and Search Methodology; Mar. 22, 2006.*

(Continued)

*Primary Examiner* — Chan Park
*Assistant Examiner* — Iman K Kholdebarin
(74) *Attorney, Agent, or Firm* — McDonnell Boehnen Hulbert & Berghoff LLP

(57) ABSTRACT

A device for applying or extracting a digital watermark of two or more dimensions and a method of applying or extracting the digital watermark. The digital watermark is generated by adding a suitable number of watermarking arrays. Each watermarking array is constructed by convolving a multi-periodic shift array having a correlation bounded by a constant (two or greater) with a balanced periodic substitution sequence.

23 Claims, 10 Drawing Sheets

(a)

(b)

(c)

(56) References Cited

OTHER PUBLICATIONS

Beard, James K., et al., "Costas Array Generation and Search Methodology," TAES, 2006, pp. 1-15.

Dittmann, Jana, et al., "Multimedia and Security Workshop at ACM Multimedia 1999," Multimedia and Security Workshop at ACM Multimedia '99, 1999, pp. 3-122.

Moreno, Oscar, et al., Double Periodic Arrays with Optimal Correlation for Applications in Watermarking, Proceedings of the 2007 International Conference of Sequences, Subsequences, and Consequences, 2007, pp. 82-94.

Tirkel, A.Z. et al., "A Two-Dimensional Digital Watermark," DICTA 1995, pp. 378-383.

* cited by examiner

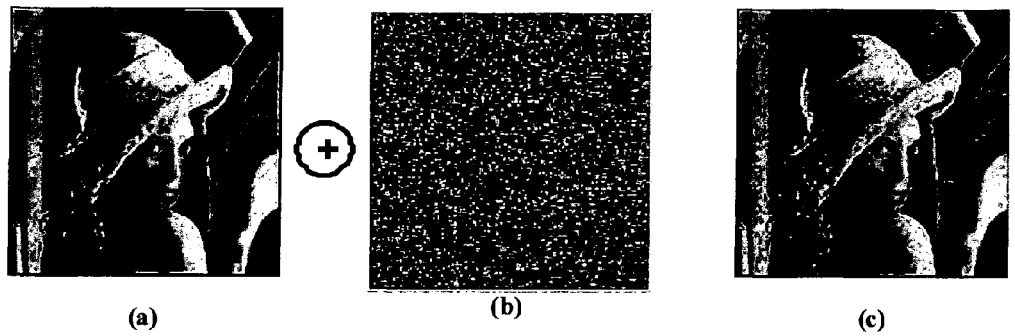
Fig 3
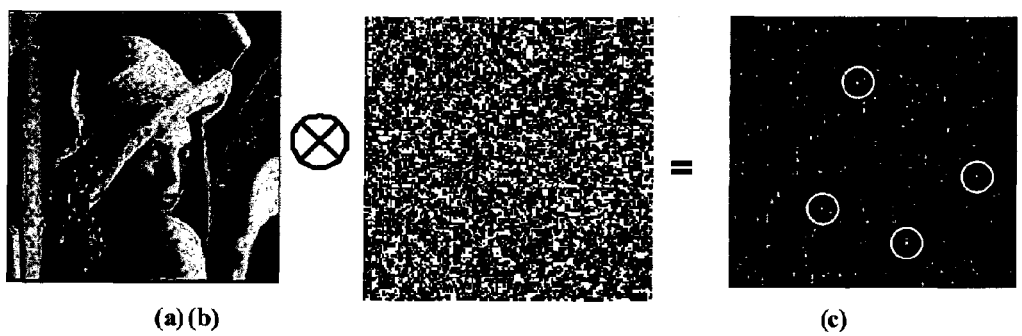
Fig 4
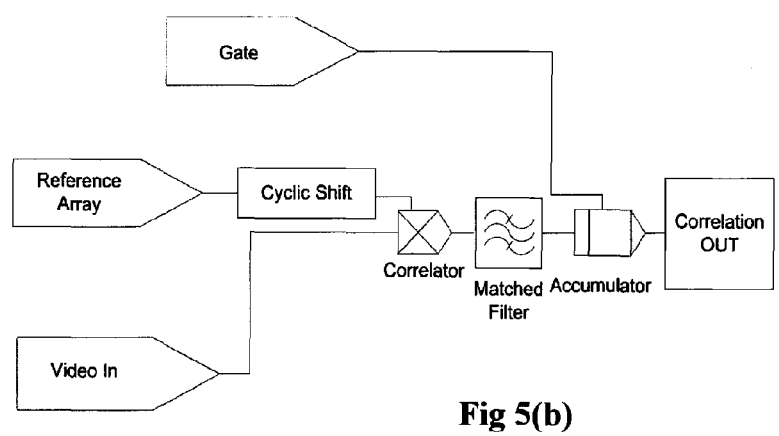
Fig 5(a)
Fig 5(b)
Fig 5

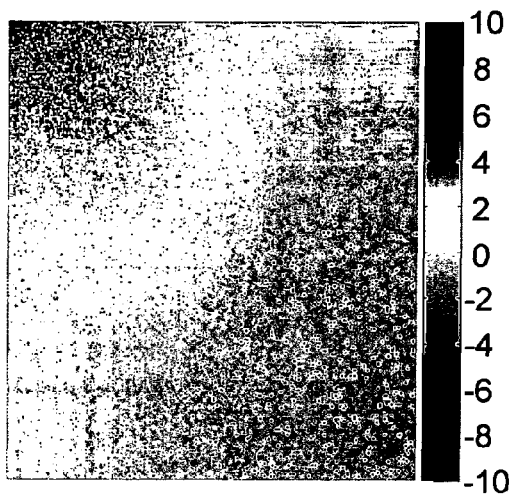 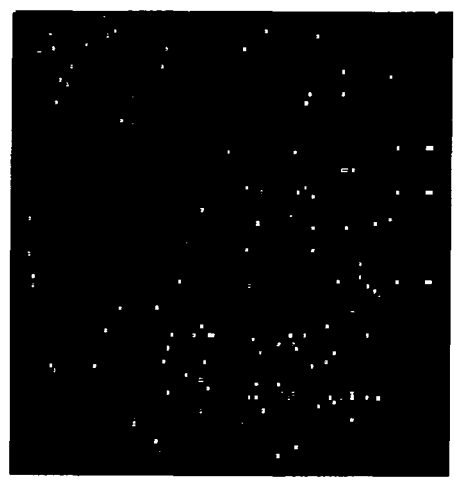
Fig 6(a)　　　　　　　　　　　Fig 6(b)
Fig 6

Black=+1, Gray=-1, White=0

Array built using the Shift Sequence = 0,4,6,4,-,6,2,2
And the Sidelnikov column sequence: 1,1,-1,1,0,-1,-1,-1

(a)

8*8 Log Quadratic Autocorrelation $f(x)=x^2+2x+1$
Shift Sequence = 0,4,6,4,-,6,2,2

(b)

8*8 Log Quadratic Autocorrelation $f(x)=x^2+x$

Shift Sequence = 4,3,1,1,-,0,3,0

(c)

8*8 Log Quadratic Cross-correlation (d)

| * | 0 | 16 | 8 | 32 | 40 | 24 |
|---|---|---|---|---|---|---|
| 1 | 31 | 11 | 26 | 12 | 14 | 5 |
| 17 | 28 | 47 | 30 | 27 | 21 | 42 |
| 9 | 22 | 34 | 39 | 13 | 20 | 19 |
| 33 | 43 | 44 | 37 | 15 | 10 | 46 |
| 41 | 18 | 45 | 3 | 6 | 23 | 4 |
| 25 | 29 | 38 | 36 | 2 | 35 | 7 |
Fig 10(a)
| * | 0 | 0 | 0 | 0 | 0 | 0 |
|---|---|---|---|---|---|---|
| 1 | 1 | 1 | 0 | 0 | 0 | 1 |
| 1 | 0 | 1 | 0 | 1 | 1 | 0 |
| 1 | 0 | 0 | 1 | 1 | 0 | 1 |
| 1 | 1 | 0 | 1 | 1 | 0 | 0 |
| 1 | 0 | 1 | 1 | 0 | 1 | 0 |
| 1 | 1 | 0 | 0 | 0 | 1 | 1 |
Fig 10(b)
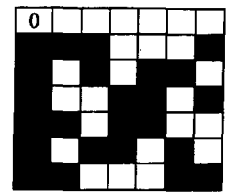
Fig 10(c)
Fig 10
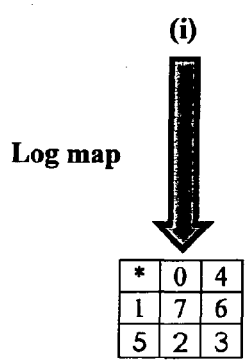
Log map
(i)
(ii)
(iii)
Fig 11(a)
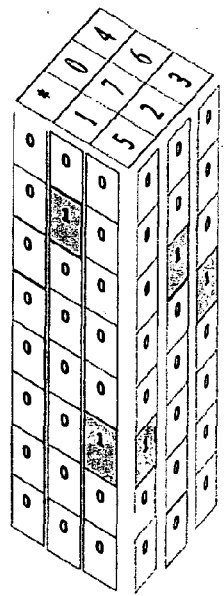
Fig 11(b)
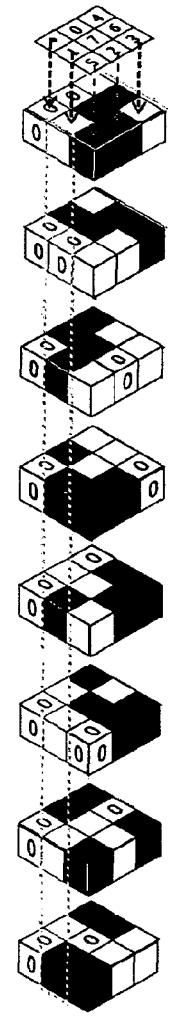
Fig 11(c)
Fig 11

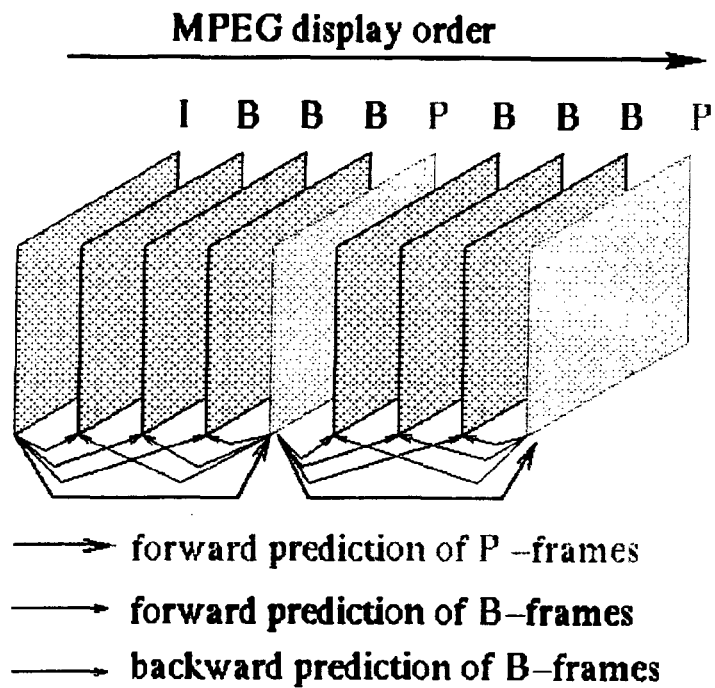
→ forward prediction of P –frames
→ forward prediction of B–frames
→ backward prediction of B–frames
Fig 14
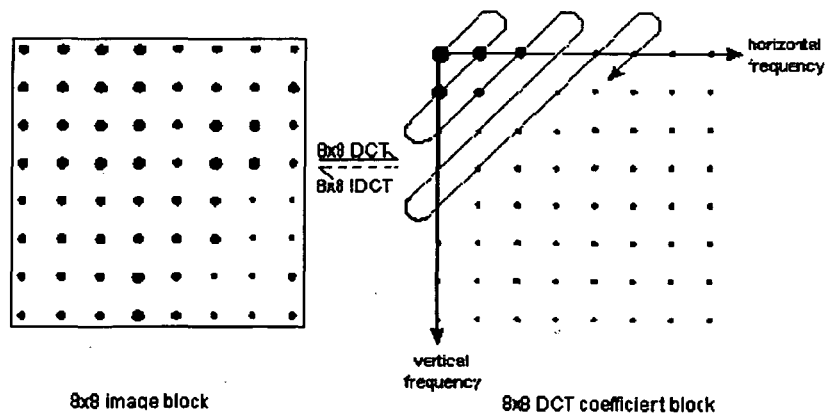
Fig 15(a)  Fig 15(b)
Fig 15

DIGITAL WATERMARKING

CROSS REFERENCE TO RELATED APPLICATIONS

The present application is a U.S. National Phase Application pursuant to 35 U.S.C. §371 of International Application No. PCT/AU2010/000990, filed Aug. 4, 2010, which claims priority to U.S. Provisional Patent Application No. 61/255,869, filed on Oct. 29, 2009. The entire disclosure contents of these applications are herewith incorporated by reference into the present application.

FIELD OF THE INVENTION

The present invention relates to the field of digital watermarking. More particularly, the invention relates to digital watermarking of images using digital watermarks of dimension greater or equal to two.

Digital watermarks are algebraically generated, multi-dimensional arrays which may be embedded and subsequently extracted from electronic media. These arrays may be used as watermarks for identifying the originator of media, as fingerprints identifying intended recipients of the media, or to identify the source of the media (e.g. serial number of camera, or support circuitry) and the date/time the data was captured. The family of arrays is large enough to provide unique identification of a very large number (essentially all) high quality video or image. The algebraic construction guarantees an upper bound on false and missed detection. These are virtually negligible under standard conditions.

BACKGROUND TO THE INVENTION

In recent years there has been a proliferation of video devices capturing images of a scene. The captured images may be still images or video images and they may or may not be in the visual spectrum. Some of these devices are for private use, such as webcam, some are for security purposes, such as surveillance cameras. In many cases these images are stored for later use. One example would be the use of images in a court of law. For legal purposes it is crucial to maintain a chain of custody over video evidence and be able to verify that the evidence has not been tampered with since it was captured. A failure in the chain of custody may lead to the inadmissibility of the video evidence.

In a case of, for example, child abduction from a shopping centre, where in the subsequent trial a surveillance video plays a crucial part in the conviction of the offender, it is vital that there be no possibility left open for the defence to claim a compromise in the video evidence itself. Currently, there is no quantitative and impartial means of establishing video integrity. This is particularly relevant because of the recent proliferation of video surveillance. The ubiquitous presence of security cameras, and the sheer volume of video and image data makes it more important and more difficult to provide an audit trail with assurance that the video evidence is reliable, or otherwise.

Currently digital image, audio, video and related media are vulnerable to theft, misuse or manipulation. A way to guard against this is watermarking technology. One of the first references to using a digital watermark for security is found in A. Z. Tirkel, G. A. Rankin, R. M. Van Schyndel, W. J. Ho, N. R. A. Mee, C. F. Osborne, "Electronic Water Mark", DICTA 93, Macquarie University, pp. 666-673, (1993). This paper introduced the concept of a spread spectrum technique to embed and recover hidden messages in images. This paper was based on a seminar presented by A. Z. Tirkel at the Department of Mathematics, Melbourne University, on Feb. 22, 1993.

The "hidden message" has become known as a digital watermark, which is defined as an embedded message, difficult to detect, but which can be recovered from the watermarked image, without access to the original unwatermarked image, by using correlation (or other) techniques and a template of the watermark. The known techniques involve the addition of a binary number sequence carrying a hidden message to pixels in a still image. The message can be embedded within the cyclic shift of the sequence. This message is recovered by correlation with all cyclic shifts of a reference sequence. The sequence used has the unique property that the correlation is high for only the zero cyclic shift.

Throughout this application, it is assumed that the term correlation denotes the dot product of a sequence or array with a complex conjugate of another (or the same) sequence or array. Where the same sequence or array is involved, it is called autocorrelation, otherwise it is called cross-correlation. Either of the sequences or arrays may be subjected to shifts. It is also assumed that all shifts are cyclic, or periodic in all the dimensions of the array. In this context, correlation is a measure of similarity, with a high value indicating greater similarity.

Since 1993, the area of digital watermarking has undergone an explosion in activity. For instance see, A. Z. Tirkel, R. G. van Schyndel, C. F. Osborne, "A Two-Dimensional Digital Watermark", DICTA'95, University of Queensland, Brisbane, pp. 378-383, (1995). Digital watermarks have been applied to still images, audio, video, text, sheet music, etc. Watermarking techniques have been used to provide copyright protection, access control, audit trail, traitor tracing, provide certificates of authenticity, etc. Watermark embedding and recovery techniques have been studied extensively and have been tailored to use the masking effect of the human visual system and human auditory system. Almost all of these advances have occurred in the applications domain. Major advances have occurred in protecting watermarks against unintentional distortions (compression, cropping, geometrical effects etc) and against deliberate cryptographic attack. New forms of attack have emerged as a result of these advances.

By contrast, the generators or sequences used to carry the message have not changed significantly. As a consequence, watermarks can benefit significantly by using families of sequences or arrays with good auto and cross-correlation. This is because multiple sets of such sequences or arrays can be embedded as composite watermarks. Such composite watermarks have three significant advantages: they are more secure against cryptographic attack, they can carry more information, and where the watermarks are used as fingerprints, composite watermarks can have immunity to collusion attack.

One popular watermarking technique that has been developed uses a statistical method to generate the watermark patterns, employing a random number generator or a noisy physical process. It is simple and effective, easy to implement, and can be made resistant to standard compression methods. Its weakness is that it cannot specify a probability that the watermarks generated by this process are "unique", or at least sufficiently dissimilar, so as never to be confused. This is not a problem for proof of ownership or copyright applications, where there are few watermarks needed, and many recipients of the media receive the same watermark. This is not true for video surveillance cameras, nor for audit trail applications, where a large number of watermarks are required. It should be noted that the statistical method can be adapted, so that any similar watermarks are "filtered out". However, this only applies to a single node of watermarking, and is difficult or impossible to implement in a distributed watermarking system, such as a network of surveillance cameras.

By contrast, the watermark method developed by Tirkel et al mentioned above is based on an algebraic construction. Originally, it used m-sequences to embed watermark information line by line in an image. It was primitive, difficult to implement, and to make resistant to compression and attack. It also suffered from visibility problems, due to the fact that each watermark was embedded in a small portion of the image: a line. However, it was free from the weakness of other methods, in that the probability of missed or mistaken detection could be specified for a set of watermarks generated using this method.

While many video watermarking solutions have been proposed, few of them are appropriate for hardware implementation. In addition, most are implemented as post-processing steps after the initial video was obtained. This means that an unwatermarked version of the image or data already exists, and that constitutes a security vulnerability.

U.S. Pat. No. 6,625,295 teaches that two and three dimensional arrays are necessary or desirable. The examples in U.S. Pat. No. 6,625,295 are all based on one dimensional binary m-sequences folded into two dimensional patterns, using the Chinese Remainder Theorem. These binary m-sequences are restricted to lengths of $2^n-1$, and the arrays they yield are limited by pairs of relatively prime factors of $2^n-1$. In addition, sets of m-sequences with good cross-correlation (maximal connected sets) [A. Z. Tirkel, C. F. Osborne, N. Mee, G. A. Rankin, A. McAndrew, "Maximal Connected Sets—Application to CDMA". *International Journal of Digital and Analog Communication Systems* 1994, vol. 7. p. 29-32.] are small, so that very few arrays built from them can be overlaid before they interfere with each other. Embedding multiple arrays in one image or other media is desirable, because it increases the information payload, or cryptographic security of the watermark. It is possible to substitute Gold Codes or Kasami sequences to overcome the mutual interference problem, but the sizes and aspect ratios are restricted, just as in the case of the m-sequences. The sequence folding technique can be extended to three or more dimensions, but the restrictions on sizes and aspect ratios become worse or untenable. U.S. Pat. No. 6,625,295 introduces the concept of three dimensional cross-correlation, without indicating how three-dimensional arrays are to be constructed.

A similar situation arises in video watermarking, where two-dimensional images (frames) are arranged in time (the third dimension). The pioneering work by Mobasseri [B. G. Mobasseri, "Direct Sequence Watermarking of Digital Video using m-frames", ICIP (2), pp. 399-403, (1998)] uses an m-sequence to select specific frames, which are then watermarked using the same, or another m-sequence. This method has the shortcoming that the unmarked frames are vulnerable to attack, and the ordering of frames can also be tampered with. A watermark in three or more dimensions would address these issues. The latter is relevant when video is accompanied by audio. A multidimensional watermark can be used to detect tampering in either video, or audio, or tampering with the synchronization between the video and audio streams. The latter is easy to achieve and has been responsible for evidence being inadmissible in a court off law.

A recent high profile leak of sensitive information by Wikileak has compromised military security and caused political havoc around the world. The material accessed could have been in any format: image, audio, video or metadata. Had the data been watermarked uniquely upon access, the source of the leak could have been identified immediately.

Therefore, new constructions of families of multi-dimensional arrays with desirable properties are essential. These properties are: low off-peak autocorrelation, low cross-correlation, balance, large family size, and availability in a variety of suitable sizes. A desirable, but not essential property is that the arrays be binary. Watermarks can be designed for a single user or multi-user application.

OBJECTS OF THE INVENTION

It is an object of the present invention to overcome or at least alleviate one or more of the above limitations.

It is a further object of the present invention to provide a device for digitally watermarking an image.

It is a yet further object of the present invention to provide a method of digitally watermarking an image.

SUMMARY OF THE INVENTION

In one form, although it need not be the only or indeed the broadest form, the invention resides in a device for applying a digital watermark to an image, the device comprising:

a storage element storing programme steps for generating a watermark of two or more dimensions;

an image sensor that acquires at least one image; and a processor that combines the at least one image or a sequence of the at least one images and the watermark;

wherein the watermark is generated by convolving a multi-periodic shift array with a balanced periodic substitution sequence or array.

Suitably the image sensor captures a digital image but may capture an analogue image which is converted to a digital image.

The watermark may be generated by adding a suitable number of watermarking arrays wherein each watermarking array is constructed by convolving a multi-periodic shift array with a balanced periodic substitution sequence or array.

In a further form the invention resides in a method of applying a digital watermark to a digital image including the steps of:

capturing a digital image;

generating a watermark by convolving a multi-periodic shift array with a balance periodic substitution sequence or array; and encoding the digital image with the watermark.

The multi-periodic shift array suitably has a correlation bounded by two.

The multi-periodic shift array is suitably a Costas array, a Sonar array or other related array.

The balanced periodic substitution sequence is suitably a Sidelnikov sequence, an m-sequence or a Legendre array.

In a still further form the invention resides in a method of identifying a watermarked digital image including the steps of:

receiving a digital image; and detecting if the image contains a watermark by performing a cross-correlation with a set of reference arrays;

wherein the reference arrays are formed by convolving a multi-periodic shift array with a balanced periodic substitution sequence or array.

The method of identifying a watermarked image may further include the steps of extracting the watermark if present; and comparing the watermark to a database of watermarks to confirm authenticity.

Further features and advantages of the present invention will become apparent from the following detailed description.

BRIEF DESCRIPTION OF THE DRAWINGS

To assist in understanding the invention and to enable a person skilled in the art to put the invention into practical effect, preferred embodiments of the invention will be described by way of example only with reference to the accompanying drawings, in which:

FIG. 3 illustrates the embedding of a watermark in an image; FIG. 3 (*a*) shows the original image before a watermark is applied; FIG. 3 (*b*) shows a watermark consisting of the sum of four binary arrays; FIG. 3 (*c*) shows the watermarked image after the addition of the watermark in the "spatial domain";

FIG. 4 illustrates the extraction of a watermark from a watermarked image; FIG. 4(*a*) shows an image to be tested; FIG. 4(*b*) shows one of the four binary arrays; FIG. 4(*c*) shows the four correlations overlaid on each other, with peaks being clearly visible;

FIG. 5 presents a simple matched filter (high pass) applied to the correlation to suppress the cross-correlation with the image; FIG. 5(*a*) shows the filter, whilst FIG. 5(*b*) shows the placement of the filter in the watermark recovery scheme;

FIG. 6 shows the effects of applying the filter of FIG. 5 to the correlation of the watermarked image with the reference watermark; FIG. 6(*a*) shows the raw correlation. The large white areas are those of unacceptably high correlation; FIG. 6(*b*) shows the filtered correlation. Note that many of the high correlation areas have been suppressed;

FIG. 8(*a*) shows a ternary 8×8 array; FIG. 8(*b*) shows the autocorrelation of the array of FIG. 5(*a*); FIG. 8(*c*) shows another ternary 8×8 array using a different polynomial; FIG. 8(*d*) shows the cross-correlation between two arrays;

FIG. 10 shows a grid mapping for elements of GF($7^2$). Exponents of a primitive element α are shown; FIG. 10(*a*) shows the raw map; FIG. 10(*b*) shows the map following a multiplication by 4, converting the array into almost binary format, thus creating a new Legendre array, which is shown in FIG. 10(*c*);

FIG. 11 shows how to build a multi-periodic shift array (matrix) and convert it into a watermarking array of the present invention; FIG. 11(*a*)(*i*) shows the powers of a primitive element in GF($3^2$) raised to all its powers in the grid format. FIG. 11(*a*)(*ii*) shows a logarithmic mapping of FIG. 11(*a*)(*i*). FIG. 11(*a*)(*iii*) shows a column sequence of length 8, (a Sidelnikov sequence 0,−1,−1,−1,+1,+1,−1,+1, where the black squares denote −1, white squares denote +1;) which is used to generate a three dimensional array. The array is generated by first placing a column of length 8 below every entry in the grid. The column contains all zeros if the entry is * and otherwise contains a solitary entry of one in the position determined by the entry in the corresponding grid location. This is illustrated in FIG. 11(*b*). The columns of FIG. 11(*b*) are then substituted by corresponding cyclic shifts of the Sidelnikov sequence of FIG. 11(*a*)(*iii*). The all zeros column is not substituted. The resulting array is shown in FIG. 11(*c*).

FIG. 12(*a*)(*ii*) shows the inverse mapping, which produces an array of cells containing the two dimensional shifts associated with each entry. FIG. 12(*a*)(*iii*) shows the 3*3 Legendre array constructed by the method described above, and illustrated for a 7*7 array in FIG. 10. FIG. 12(*b*) shows how each of the two dimensional shifts of FIG. 12(*a*)(*ii*) are used to shift the Legendre array of FIG. 12(*a*)(*iii*) to produce 8 layers of a three-dimensional array.

FIG. 13 (*a*)(*i*) shows the starting grid. FIG. 13 (*a*)(*ii*) shows a simple quadratic map x→$x^2$ FIG. 13 (*a*)(*iii*) shows the array of shifts obtained by looking up FIG. 13 (*a*)(*i*). This array of shifts is then used to cyclically shift a 3*3 Legendre array shown in its (0,0) shift in FIG. 13(*a*)(*iv*). The resulting four dimensional array is shown schematically in FIG. 13(*b*), where only some of the entries are shown.

FIG. 14 shows the inter-frame compression method of MPEG. The I frames are independent reference frames, whilst the B frames store backward prediction coefficients, and P frames have forward prediction coefficients;

FIG. 15 shows a typical intra-frame compression method for video; FIG. 15(*a*) shows an 8×8 image block; FIG. 15(*b*) shows a Discrete Cosine Transform (DCT) of the block in FIG. 7(*a*) and the MPEG method of reading it out. Note that FIG. 15(*a*) is the Inverse DCT of FIG. 7(*b*).

DETAILED DESCRIPTION OF THE INVENTION

Figure 1:
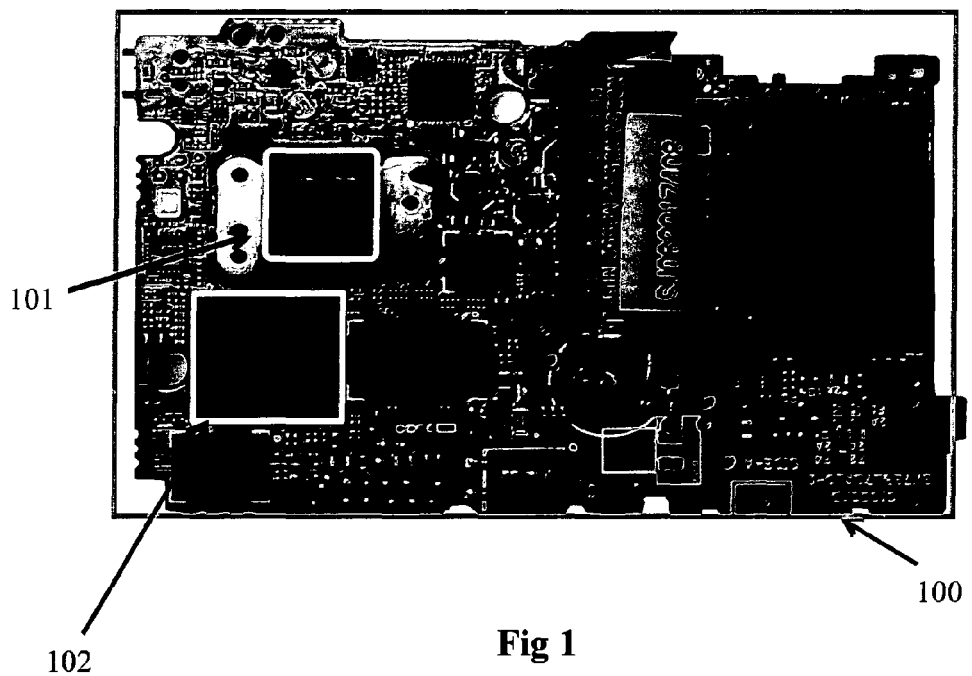
FIG. 1 shows one embodiment of digital watermarking on a motherboard.

Embodiments of the present invention reside primarily in devices and methods for implementing digital watermarks in images. Accordingly, the method steps device integers have been illustrated in concise schematic form in the drawings, showing only those specific details that are necessary for understanding the embodiments of the present invention, but so as not to obscure the disclosure with excessive detail that will be readily apparent to those of ordinary skill in the art having the benefit of the present description.

In this specification, adjectives such as first and second, left and right, and the like may be used solely to distinguish one element or action from another element or action without necessarily requiring or implying any actual such relationship or order. Words such as "comprises" or "includes" are intended to define a non-exclusive inclusion, such that a process, method, article, or apparatus that comprises a list of elements does not include only those elements but may include other elements not expressly listed, including elements that are inherent to such a process, method, article, or apparatus.

In the subsequent discussion of preferred embodiments, the words "audio", "image" and "video" are employed interchangeably to refer to one, two, three, and higher dimensional digital signals. Some multimedia consist of three-dimensional video accompanied by multi-channel audio to convey the spatial nature of surround sound. The composite signal can be treated as a signal whose dimensionality is between 5 and 14. The constructions presented herein can be applied in any of these dimensions, and are not limited in the number of dimensions that can be supported. This can be an important issue. A common and extremely simple method of tampering with audio-visual evidence is by corrupting the synchronization between the audio and the video, for example, delaying or advancing the sound track. In one murder case, the soundtrack containing the recording of the gunshot was time shifted with respect to the video. However, it was not possible to prove that such tampering had occurred. Had a suitable multi-dimensional watermark been embedded in the video, proof of tampering would have been easy.

The following description presents the implementation of the invention in hardware. This is a most likely application, although the ideas and methods described are not thus restricted. The invention may also be implemented in firmware or software.

In order to make clear the preferred embodiments of the watermarking scheme implemented in hardware, the implementation is described as a modification to typical image/video sensor circuitry. Many variations of sensors and image/video processors exist, so the following interpretation is representative or typical. A person skilled in the art would be able to adapt the method to other image/video sensors and processing circuitry without undue experimentation.

The description below shows how to modify an existing sensor's circuitry to insert a watermark in every image or sequence of images captured by that sensor. Also described is how to use this circuitry to determine if a video under test contains a watermark.

FIG. 1 shows a typical image/video sensor 101 on its motherboard 100. Video sensors are fundamentally image sensors, which output signals quickly enough to capture changing images, and include time dependent processing. The image sensor 101 typically consists of a CMOS (Complementary Metal Oxide Semiconductor) or CCD (Charge Coupled device) imaging array, which captures the incident light, and converts it into electrical charges. These charges are read out in a sequence, converted into analog voltages, amplified and conditioned to reduce noise or interference, or to suppress offsets due to dark current. These voltages are then digitized in an ADC (Analog to Digital Converter) and read out from the sensor in an orderly manner and passed on to the image processor chip 102. This chip, which can take the form of a FPGA (Field Programmable Gate Array) or a DSP (Digital Signal Processor), or an ASIC (Application Specific Integrated Circuit) assembles the signals from the sensor into an ordered array of pixels, corrects for pixel non-uniformities, and performs image compression, pixel and color interpolation, edge detection and related image calculations. In video sensors, the chip also performs conversion into standard video format such as PAL, NTSC or SECAM. The rest of the circuit board 100 provides power supplies and control voltages for the chips 101 and 102 and a bidirectional communication link to the outside world.

In video surveillance or video analysis, more sophisticated operations, such as object detection, target tracking, or pattern matching may be required. These high-end operations may need to be performed under poor light conditions, in crowded and confusing environments. This may need sophisticated techniques borrowed from AI (Artificial Intelligence), which currently can only be implemented on fully featured processors or co-processors. Such heavy duty processing can be centralized or distributed. In the centralized version, the image data from a number of sensors can be processed by a CPU (Central Processor Unit). This has the advantage of economies of scale. However, it can only cater for a limited number of sensors (cameras) and has to deal with huge amounts of data and to provide corrections for different environmental conditions, distortions and perspective issues confronting individual cameras. The distributed system uses a dedicated CPU and possibly a co-processor, in a suitable small package, attached to each camera to perform most of the above tasks, leaving just the co-ordination task to the central control unit. This has the advantage of catering for any reasonable number of cameras in the system.

Figure 2:
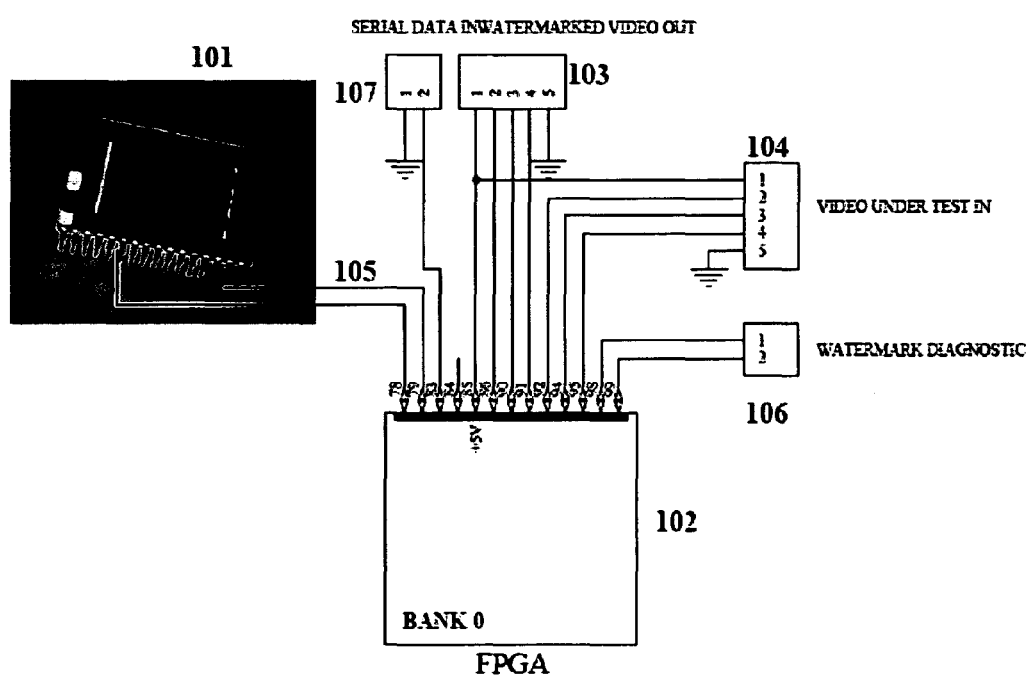
FIG. 2 shows a conceptual circuit used to embed a digital watermark into a video stream from a sensor and to extract any watermark present in a video image.

The hardware of FIG. 1 requires minor modifications to implement a digital watermark. The hardware is shown schematically in FIG. 2. The image processor 102 receives the raw image/video signal from the sensor 101. The connection is via a signal bus 105. Only two wires of bus 105 are shown. The image processor 102 performs the watermark insertion into the image/video signal, as described in subsequent sections. The watermarked image/video signal is output to connector 103, where it is available to the outside world.

The same hardware can be used to test an image/video to determine if a watermark is present. The image/video under test is input via connector 104, whereupon it is processed by the image processor 102 to determine if a watermark is present. This process is described in subsequent sections. The result of the watermark detection process: e.g. watermark present, watermark absent, watermark present but tampered with, etc. is output by the image processor 102 to another connector 106, whose output is available to the outside world.

In this arrangement the only place where the raw (unwatermarked) image/video signal is available is on bus 105 and on the pins of the sensor 101 and some pins of the image processor 102. For maximum security benefit of the watermarking scheme in this application it is necessary to ensure that these signals are not available to anyone. This can be achieved by encapsulation of that portion of the circuit by potting or similar techniques. Alternatively, 3D circuit techniques, such as stacking the image/video sensor and the image processor and/or burying any interconnects in buried layers, can ensure raw data security. Yet another method of ensuring data security is by on-chip encryption within the image/video sensor. Any of these techniques can be applied in isolation, or jointly to make sure that the raw image/video signal is not intercepted by anyone.

On-chip image processing is not essential to the invention, merely preferable for a high level of data security. Image/video may be watermarked on-board but transmitted to a central storage or monitoring location. Testing of image/video may also occur off-board. For instance, in one implementation, image/video signals may be watermarked on-board and then encrypted for transmission to a central storage location. At a later time the image/video signals may be tested by an independent verification entity to confirm the presence of the watermark and thus verify the image/video.

In order to understand the watermark embedding process, FIG. 3(a) shows a representative image obtained from image sensor 101. FIG. 3(b) shows a watermark obtained by adding four inequivalent two-dimensional binary arrays. In this context, inequivalent means that none of the four arrays can be obtained by any two-dimensional cyclic shift of any other array in the set. Information is contained in the cyclic shift of the four arrays. Such information can be the serial number of the image sensor, or the image processor. Preferably, such information should be secure. Some image processor manufacturers provide security of serial numbers. That is, each image processor is guaranteed to be manufactured with a unique serial number. The unique serial number can be part of the watermark since it will uniquely identify all images originating from the particular device implementing the image processor. The information can also contain the time, sequence number of the image, or any important information, which is to be embedded in the image.

In order to embed the watermark in the image, it is scaled by multiplication by an appropriate constant, or weighting function, so that it is unobtrusive to the human eye, or so that the image distortion introduced by the watermark meets some engineering criterion. The weighting function may be determined by the sensitivity of the HVS (Human Visual System). A typical watermarked image is shown in FIG. 3(c). It should be noted that the image could be transformed by any invertible transform before the process which has been described here, and then inverse transformed afterwards.

The number of possible transforms is huge, but only a few (e.g. Fourier, DCT, wavelet, fractal) are useful. The human visual and auditory system responses have particular characteristics in each transform domain, and these have been exploited by pre-emphasizing watermark components in regions of low human sensitivity, so that these strong components are "masked, and the stronger watermark is still difficult to discern by a human viewer or listener.

In this application, the watermarking process is illustrated in the "spatial domain", although it is not restricted in that way. A person skilled in the art can apply the necessary transforms and their inverses and convert the watermark to the desired transform domain.

The watermark extraction process is illustrated in FIG. 4. An image to be tested is input into the image processor 102 via the connector 104. In this illustrative example, this is a legitimate image, as produced by the process shown in FIG. 3 without any distortions. This image is subjected to a correlation test. It is cross-correlated with all two dimensional cyclic shifts of each of the four reference arrays that were embedded in the original image. One of the four arrays in a particular cyclic shift is shown in FIG. 4(b). The result of these cross-correlations is shown graphically, where the highest of the four cross-correlations for each of the possible cyclic shifts of the reference arrays is shown in FIG. 4(c). Four peaks are clearly visible above the background. These peaks exceed the threshold for watermark detection. In order to make the peaks more clearly visible, a spatial filter was employed in producing FIG. 4(c). The concepts behind this filter, thresholding and other details of the watermark detection are explained in subsequent sections. The locations of the four peaks belonging to the four cross-correlations represent the data carried by the watermark. The choice of arrays provided by the method in this patent is huge, so the search space involved in the above cross-correlations may be prohibitive. A means of restricting the search may be required. One such method could involve assignment of a set of arrays based on the serial number of the FPGA, camera or computer. Another method could involve a gateway function. All arrays could be catalogued in a lexicographic manner, with each being given a unique identifier. A universal array or set of arrays could be used in a similar manner to a control channel in communication technology to hide the identifier(s) of information carrying arrays. In this manner, watermarks could be recovered by performing correlations over all cyclic shifts on only those arrays which are present in the image/video. This is a manageable search space.

As mentioned above the watermark extraction process can be conducted away from the image processor 102. However, in that case, the two dimensional cyclic shifts of each of the four reference arrays that were embedded in the original image will need to be available for the cross-correlation. It will be appreciated that this will mean a reduction in security but this may be acceptable in many applications.

A penalty of not having access to the unwatermarked image is that it cannot be subtracted from the image under test before the cross-correlation. If that were possible, the cross-correlation for an image carrying the correct watermark would be essentially between the embedded arrays, suitably scaled as explained above, and the reference arrays. This cross-correlation would be contaminated only by incidental or deliberate image distortions, or by cross-correlation between different arrays contained in the watermark, but not by the cross-correlation with the image data. By contrast, the method described herein must contend with the latter, which is typically much stronger than the watermark, because of the scaling. The cross-correlation between different arrays contained in the watermark is low by design, as explained in later sections. It is assumed that the auto-correlation of an array for non-zero cyclic shifts is negligible. Once again, this is guaranteed in the present invention, as shown in later sections.

The decision on the presence or absence of a watermark in the image under test is based on statistical considerations. This is because of the distortions which could be present in the image under test, and this includes the image data. Statistical analysis can be used to determine the thresholds for watermark presence and absence detection, and how these thresholds are related to the embedding strength (scaling) of the watermark.

The statistical analysis shows that for meaningful thresholds, the probabilities of wrong or missed detection are unacceptably high when the unwatermarked image data is unavailable and hence it is not possible to remove the cross-correlation with the image data. However, there are other methods which can be applied to overcome this issue. The cross-correlation of the image data with the arrays contained within the watermark is random, whilst the autocorrelation of an array is impulsive. Hence, a matched filter can be used to process the correlation results before the application of decision thresholds. An example of such a scheme is illustrated in FIG. 5 and FIG. 6.

FIG. 5(a) shows a typical two dimensional Laplace high-pass filter, used to process the correlation data before thresholding. Such filters are traditionally used in edge detection. They can be combined with other filters such as Gaussian filters used for noise reduction. Adaptive filters may also be useful in this context. FIG. 5(b) shows where the filter fits into the extraction process.

FIG. 6(a) shows the raw cross-correlation plot of one of the arrays contained in the watermark of FIG. 3(b), also shown in FIG. 4(b) and the image under test. The coordinates of the plot are the two-dimensional cyclic shift applied to the reference array. The light shades indicate high correlation, which is present for almost all cyclic shifts. FIG. 6(b) shows the result after passing the correlation data in FIG. 6(a) through the Laplace high-pass filter of FIG. 5. The bright regions of FIG. 6(a) are gone, and most of FIG. 6(b) is black, indicating low cross-correlation. It is clear that most of the high correlation regions have been removed, and the thresholding process is capable of providing watermark detection or absence decisions with acceptable probabilities of error.

The watermarking scheme described in the previous sections relies on the existence of families of two dimensional arrays with low auto-correlation for all non-zero cyclic shifts, and low cross-correlation for any pair of arrays for any cyclic shift. In subsequent sections we illustrate how such families of arrays can be constructed, using concepts from the theory of Finite Fields.

Array Construction

We describe new families of arrays (and their variations) which satisfy these requirements. Our constructions are based on a method developed in [A. Z. Tirkel, C. F. Osborne and T. E. Hall, "Steganography—Applications of coding theory", *IEEE Information Theory Workshop, Svalbard, Norway*, 1997, p. 57-59.]

The essential ingredients of this method are a column sequence with good autocorrelation and a matrix (alternatively referred to as a shift sequence). The shift sequence is used to shift (rotate) the column sequence according to the entry in the shift sequence at the location of the column, thus producing a two-dimensional array. The shift sequences in [A. Z. Tirkel and T. E. Hall, "A unique watermark for every image", *IEEE Multimedia*, October-December, 2001, 30-37.] were produced by considering quadratic and higher degree polynomial maps of a base field $\mathbb{Z}_p$. They are optimal, in the sense that all polynomials result in shift sequences, with every entry being filled by an integer ranging from 0 to p−1. However, these arrays are only available in sizes p×p, where p is prime, and only in two dimensions. The array size is incompatible with standard image or image block sizes, and the restriction on two dimensions makes them difficult or impossible to use in video or multimedia watermarking. To address these issues we describe novel shift sequences and shift arrays (matrices). Shift arrays are multi-dimensional generalizations of shift sequences, which meet the requirements of watermarking, as described above. These new shift sequences and shift arrays are compatible with known column substitution sequences and yield watermark arrays in many more sizes than the arrays produced by the constructions outlined in [A. Z. Tirkel and T. E. Hall. "Matrix Construction Using Cyclic Shifts of a Column" ISIT'05 Adelaide p. 2050-2054 . . . ], and they can be generalized to any number of dimensions.

Two Dimensional Constructions

We first illustrate our new construction in two dimensions. They are available in sizes $(p^n-1) \times (p^n-1)$ where p is prime and n is any positive integer, including 1. Note, that these sizes are complementary to the p×p and related arrays of A. Z. Tirkel and T. E. Hall. "Matrix Construction Using Cyclic Shifts of a Column" ISIT'05 Adelaide p. 2050-2054. Many of the new arrays are compatible with image or image block sizes. Here, image size refers to the number of pixels in the horizontal direction by the number in the vertical dimension. Images are normally processed in blocks, such as the common 8×8 block.

The new matrices $s_i$ are produced by mapping polynomials over finite fields using a logarithmic function [Oscar Moreno and Svet Maric "A Class of Frequency Hop Codes with Nearly Ideal Characteristics for Multiple-target Recognition" ISIT 1997, Ulm, Germany, June 29-July 4, p. 126], as below Construction A1

$$s_i = \log_\alpha(A\alpha^{2i} + B\alpha^i + C)$$

Construction A2

$$s_i = \log_\alpha(A_n\alpha^{ni} + A_{n-1}\alpha^{(n-1)i} + \ldots + A_k\alpha^{ki} \ldots + A_0)$$

α is a primitive element of a finite field GF(q) where q is the number of elements and is a prime power $q=p^n$ where p is prime and n is any positive integer, including 1. i is an index taking on the values 0, 1, 2, . . . q−2. $s_i$ takes on the values 0, 1, 2, . . . , q−2, ∞, where ∞ results from the argument of the log function being equal to 0. A, B, C and any of the $A_k$ are suitably chosen entries from GF(q).

1. GF(q)={0, $\alpha^1, \alpha^2, \ldots, \alpha^{q-1}$}. In this context log refers to $\log_\alpha x = j$ implies that $x = \alpha^j$.
2. Construction A2 is a generalization of A1, where the family size is larger, but the auto and cross-correlations are also larger.
3. A matrix S is produced by placing an entry of 1 in the horizontal position i and vertical position $s_i$ and 0 elsewhere.
4. Note that the log mapping is 1:1 i.e. there is a single value of $s_i$ for each i.

The matrices from A1 have the following property: for any non-zero doubly periodic shift of such a matrix, its auto correlation is equal to or less than 2. Some of the matrices generated are shifts of each other, and hence have bad correlation. There is an equivalence relation which makes $(q-1)^2$ choices of A, B or C redundant, and hence there are approximately q inequivalent matrices in the family. It can be shown that all inequivalent quadratics can be represented by q choices of C in: $s_i = \log_\alpha(x^2 + x + C)$.

Each of these matrices from A1 can be assigned to a different user. A doubly periodic cross-correlation between any pair of such matrices is also equal to or less than 2. These matrices may also find application in modulating radar signals for multi-target recognition and in OCDMA (Optical Code Division Multiple Access).

The watermarking array construction relies on replacing any column i of matrix S with a 1 in it (notice that each column has either 0's and a 1 or an ∞) by a known column over roots of unity, with good correlation in a cyclic shift equal to $s_i$ for that column in S. Note that Columns commensurate with this construction are: Sidelnikov Sequences, Legendre sequences, m-sequences and Hall sequences and others. This is the first time Sidelnikov sequences have been used in such a construction.

Columns with ∞ in them can be replaced by a string of 0's. This reduces the peak autocorrelation by q−1, but has almost no effect on the off-peak autocorrelation, or the cross-correlation. Where there is only one column with a ∞, the column can be replaced by a string of constant values, including +1 or −1. The autocorrelation is even better than when the constant is 0 whilst the cross-correlation can increase by q−1. When there are two or more entries with ∞, the best option is to replace them by a string of 0's. This reduces the peak autocorrelation even further, and makes such arrays less desirable.

For Construction A1, ∞ may occur 0, 1, or 2 times, depending on the choice of A, B and C. 0 occurs if the polynomial is irreducible, 2 if it is reducible with two factors and 1 if it is a square.

Therefore it is desirable for the quadratic in A1 to be irreducible. Quadratics of the form $x^2+x+C$ yield arrays, which are not related by two dimensional cyclic shifts, and are hence inequivalent. It can be shown that for odd q, $$C = \frac{1 - \alpha^{2k+1}}{4}$$

results in an irreducible quadratic, whilst for even q, a choice of C such that $Tr_q^{q}(C) = 1$ results in an irreducible quadratic.

The number of such irreducible quadratics is large. Arrays built using irreducible quadratics have optimal correlation properties. An automatic inequivalent irreducible quadratic generator is desirable for watermark construction.

Figure 7:
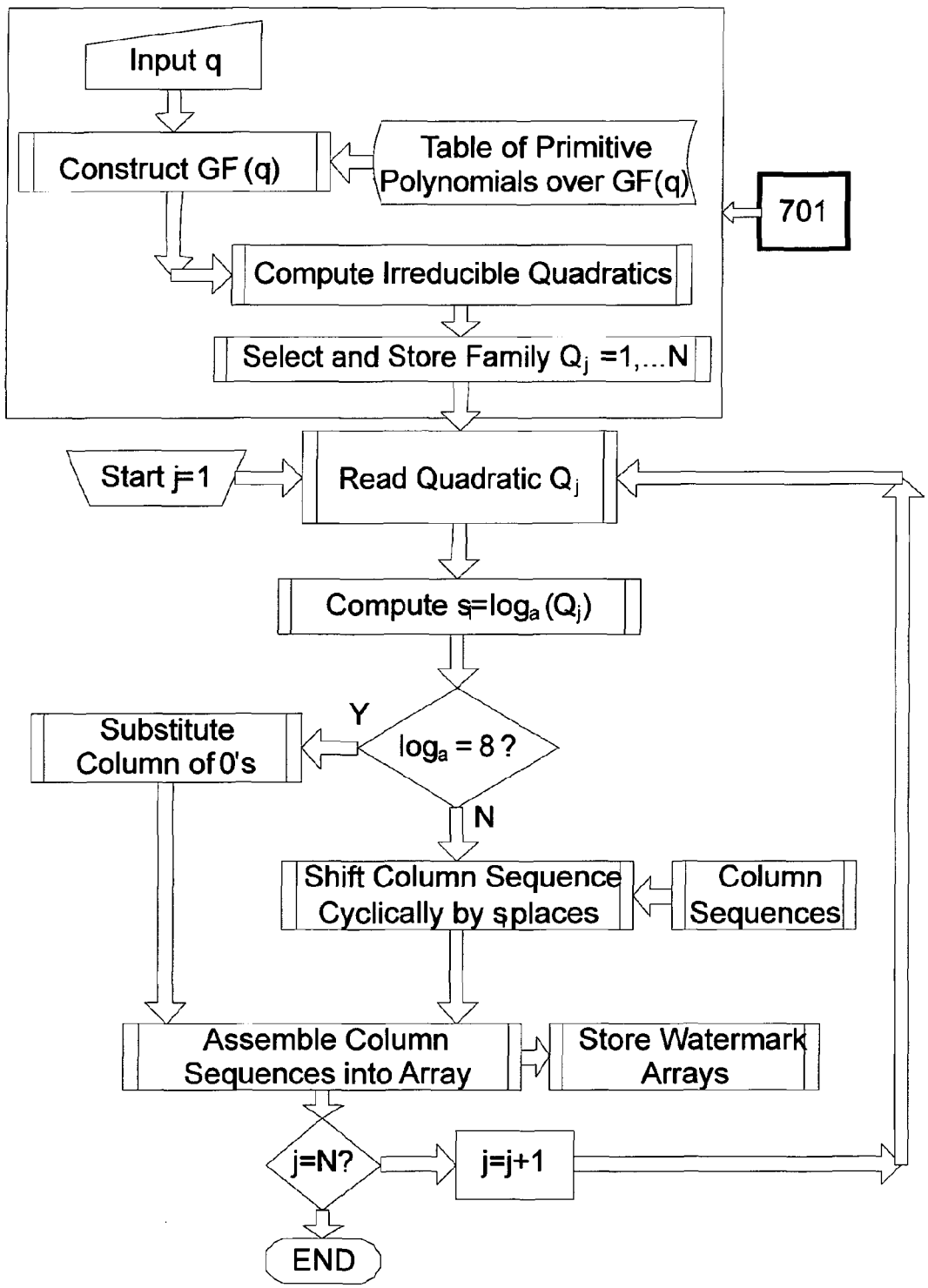
FIG. 7 shows a flowchart of the array generator. This generates all possible arrays of a particular size for a given column sequence. The arrays are all distinct and possess no blank columns.

A flowchart of an array generator, which makes use of an irreducible quadratic generator 701, is shown in FIG. 7.

The normalized absolute values of all off-peak auto and cross correlations for these watermarking arrays are bounded by approximately 2/q for m-sequence columns and 4/q for Sidelnikov columns.

These constructions are new, and available in desirable sizes and alphabets. The array alphabet is determined by the column sequence alphabet. The most common alphabet is the set of complex roots of unity, with binary being the preferred option for watermarking.

For example, Construction A1 delivers almost binary arrays of sizes 8×8, 16×16, 256×256. These are desirable in watermarking and other applications, and have not been available before. The arrays are square and balanced (equal numbers of +1's and −1's).

Figure 8:
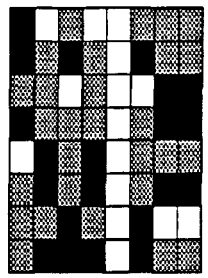
FIG. 8 illustrates an example of two new arrays generated using the new algebraic construction of the present invention.
Figure 8:
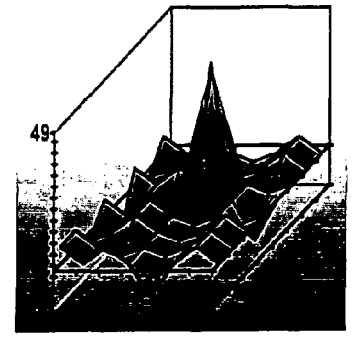
Figure 8:
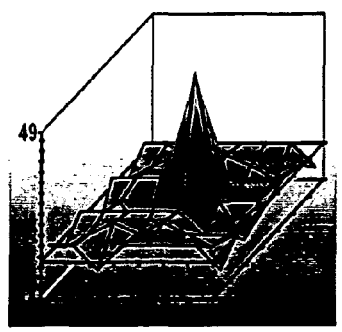
Figure 8:
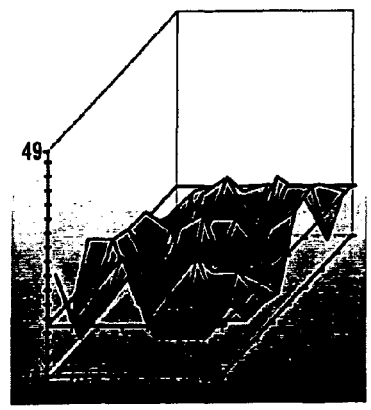

An illustration of the new arrays is presented in FIG. 8. FIG. 8(a) shows a typical array constructed using a shift sequence of [0,4,6,4,–,6,2,2] and a Sidelnikov column sequence of [1,1,–1,1,0,–1,–1,–1]. The '–' in the shift sequence is due to the use of a reducible quadratic. In the array a black box is +1, a gray box is –1 and a white box is 0. FIG. 8(b) shows the two dimensional periodic autocorrelation of the array of FIG. 8(a). The quadratic is $f(x)=x^2+2x+1$. FIG. 8(c) shows the autocorrelation of a different array built using the same construction with a shift sequence of [4,3,1,1,–,0,3,0] constructed using the quadratic $f(x)=x^2+x$. FIG. 8(d) shows the cross-correlation between the two arrays. The arrays shown are not optimal, in that one contains a blank column, since it is derived from a reducible quadratic.

A typical image compression method uses 8×8 blocks, which are transformed using a Fourier Transform or the discrete wavelet transform (DWT). The 0 frequency (DC) component in Fourier, or the corresponding scale component in DWT, is not altered in the compression process. Therefore the 64 pixels within a compression block can have their intensities altered by a constant offset which is compression resistant. Hence, a simple way of making the new arrays compression resistant is to apply them by treating each 8×8 pixel block as a single entity. For example, a 128×128 image could then support a 16×16 array. Such arrays are generated by using p=17 and n=1.

Three Dimensional Constructions

There are several ways of modifying and extending the method used to construct two dimensional arrays described above, to produce families of three dimensional arrays. The resulting three dimensional arrays differ in their size and shape, the family size and the correlation values. The descriptions of these variations below are representative, but not exhaustive, in that a person skilled in the art may modify them. For example, all the constructions can be extended in size by multiplication by known perfect binary arrays, or other known arrays with desirable correlation properties, where the dimensions are relatively prime. Also, all the constructions are not limited to binary arrays, since the columns/arrays employed in the constructions are available over many alphabets.

Construction B1:

Folding the Shift Sequence into 2D

Take the shift sequence $s_i$ of A1. Take the Finite Field to be $GF(q^a)$. This gives us a two dimensional array of size $(q^a-1)\times(q^a-1)$. Now factor $q^a-1$ as follows:

$$(q-1)(q^{a-1}+q^{a-2}+\ldots+1).$$

Now our three dimensional array will be $$(q^a-1)\times(q-1)\times(q^{a-1}+q^{a-2}+\ldots+1)$$

Note that we require that (q–1) is relatively prime to $(q^{a-1}+q^{a-2}+\ldots+1)$. From Construction A1 using the Chinese Remainder Theorem we can obtain Construction B1.

Construction B1 has exactly the same properties as A1, but it can be used in three dimensional applications, such as video watermarking.

Construction B2:

Two quadratic Extension of Construction A1

Two variations of this construction have different properties.

Construction B2(a):

This makes use of the same Finite Field GF(q) as Construction A1.

$$s_{i,j}=\log_\alpha(A\alpha^{2i}+B\alpha^i+C+A'\alpha^{2j}+B'\alpha^j+C')$$

where i,j are indices taking on the values 0, 1, 2, ... q–2.

Construction B2 is genuinely three dimensional (cubic geometry), has approximately $q^2$ users, and similar (scaled) correlation performance to Construction A1. Maximum off-peak autocorrelation and cross-correlation is 2q, whilst peak autocorrelation is $q^2$.

Construction B2(b):

This requires a Finite Field of the type $GF(q^2)$, where q is a prime power. GF(q) is a proper subfield of $GF(q^2)$. The primitive element α of GF(q) used in all other constructions is derived from some primitive element β of $GF(q^2)$, with α= $\beta^{q+1}$. Construction B2(b) makes use of the fact that 1,β forms a basis for the vector space $GF(q^2)$ over GF(q). Therefore, the following two quadratic extension of Construction A1 is possible:

$$s_{i,j}=\log_\alpha((A\alpha^{2i}+B\alpha^i+C)\times 1+(A'\alpha^{2j}+B'\alpha^j+C')\times\beta)$$

Here i and j take on the values: 0, 1, 2, ..., q–2, whilst the log function takes the values: 0, 1, 2, ..., $q^2-2$, ∞. Just like Construction B2(a), there are approximately $q^2$ users, with a maximum off-peak autocorrelation and cross-correlation of 2q, whilst peak autocorrelation is $q^2$. Construction B2(b) is cryptographically more secure than Construction B2(a).

Constructions B2 can be extended to an arbitrary number of dimensions

Construction B3:

When q in Construction A1 is a power of 2, the shift sequence from Construction A1 can be used to shift two dimensional arrays such as binary m-arrays. The resulting 3 dimensional construction has similar properties to Construction B1.

A totally different set of three dimensional constructions can be obtained by using a partition of the finite field $GF(p^2)$ to generate a unique (Costas) grid.

Figure 9:
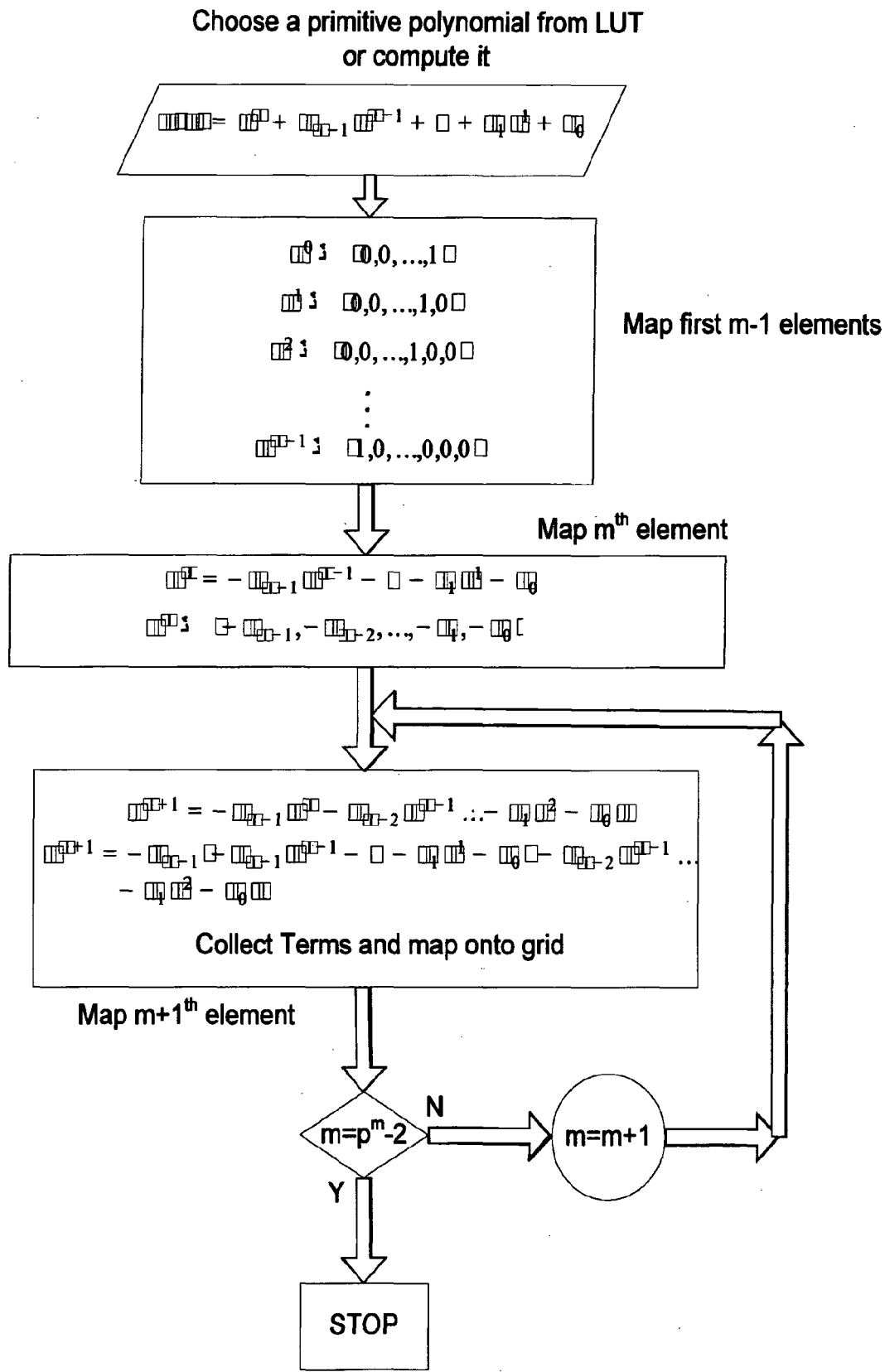
FIG. 9 shows a flowchart of the generation of and the placement of all elements of GF($p^m$) onto an m dimensional grid of the type p×p×p . . . ×p.

We write the elements of $GF(p^2)$ as doubletons based on α, a primitive element.

$$\alpha^1=(1,0)\alpha^2=(.,.),\alpha^3=(.,.),\ldots,\alpha^{p^2-1}=(0,1)$$

Where each doubleton has entries from $\mathbb{Z}_p$. Consequently, the doubletons define an integer grid in two dimensions, which can be used as a basis for a three dimensional periodic Costas array. The construction can be generalized to m dimensions. A method of generating and mapping all elements of $GF(p^m)$ onto an m-dimensional grid is shown in the flowchart of FIG. 9.

This grid can be used to construct a single array in three dimensions with matrix correlation 1.

Consider $s=\log_\alpha X$ where $X \in GF(p^2)$. Specifically for $X=\alpha^i$, $s_i=\log_\alpha\alpha^i=i$. The sequence scheme is to use the doubleton representation of $\alpha^i$ to determine the co-ordinates (location) on the two dimensional integer grid defined above. $s_i$ is a periodic sequence with period $p^2-1$. An example of this method of mapping is shown in FIG. 10. It displays the map for $GF(7^2)$. For our Costas type construction we take the grid point location belonging to $s_i$, and place a 1 at position i in a column of length $p^2-1$ located below the grid point, and zeros in all other entries in that column. This matrix has an off-peak autocorrelation of at most 1.

Multi-Dimensional Legendre Sequence

The map of FIG. 10 can itself be converted into a two-dimensional array over the symbols +1, –1, 0. This can be achieved by reducing the numbered entries in FIG. 10 modulo 2 and mapping 0 onto +1, and 1 onto –1. The * is mapped onto 0. We call this new array a two-dimensional Legendre array. A two dimensional 7×7 Legendre array derived from FIG. 10(a) is shown in FIG. 10(b). The two dimensional periodic autocorrelation of this array is –1 for all non-trivial shifts.

This method of alphabet reduction can be applied modulo k, as long as k divides m. It can be performed on arrays of this type in dimensions higher than 2. This array will be employed in the construction of families of higher dimensional arrays in constructions C. Its existence is vital.

The matrix can be converted into a binary or higher alphabet array by substituting a pseudonoise sequence in place of the sequence of 0's and 1's. This process is illustrated in FIG. 11. FIG. 11(a)(i) shows the powers of a primitive element in GF($3^2$) raised to all its powers in the grid format. FIG. 11(a)(ii) shows a logarithmic mapping of FIG. 11(a)(i). FIG. 11(a)(iii) shows a column sequence of length 8, (a Sidelnikov sequence) which is used to generate a three dimensional array. The array is generated by first placing a column of length 8 below every entry in the grid. The column contains all zeros if the entry is * and otherwise contains a solitary entry of one in the position determined by the entry in the corresponding grid location. This is illustrated in FIG. 11(b). The columns of FIG. 11(b) are then substituted by corresponding cyclic shifts of the Sidelnikov sequence of FIG. 11(a)(iii). The all zeros column is not substituted. The resulting array is shown in FIG. 11(c).

The array in FIG. 11(c) is solitary, so by itself it does not address the requirement of delivering large families of arrays with low off-peak autocorrelation and low cross-correlation. However, the modifications described below do deliver such families.

In the next two constructions we use the grid just like the one in FIG. 10, which is for arrays of size 7*7, or the one of FIG. 11, which is for arrays of size 3*3. We show how to construct two sets of families of arrays whose matrix auto and cross-correlation≤2.

Construction C1:

Take $A, B, C \in GF(p^2), A \neq 0$

Let $s_{kl} = \log_\alpha(AX^2 + BX + X)$

Here $X = \alpha^i$ with a being a primitive element of GF($p^2$) and k and l refer to the grid coordinates of $\alpha^i$. In this family, two shift arrays $s_{kl}$ and $s'_{kl}$ are equivalent if the watermark arrays they generate are multi-periodical shifts of each other. The number of non-equivalent classes is approximately $p^2$.

Construction C2:

Take $A, B, C, D \in GF(p^2), AD - BC \neq 0$ $$s_{kl} = \log_\alpha \frac{AX + B}{CX + D}$$

The equivalence classes are defined similarly to Construction C1, and the number of non-equivalent arrays is also similar to Construction C1.

Construction C1 can be generalized by using polynomials with degree greater than 2 and Construction C2 with polynomials of degree greater than 1.

A watermarking array is constructed by using $s_i$ belonging to each coordinate on the grid to cyclically shift a binary Sidelnikov sequence of length $p^2-1$. Our construction guarantees that no more than 2 such Sidelnikov columns can match and therefore the worst case autocorrelation and cross-correlation is of the order of $2p^2$. The peak autocorrelation is of order $p^4$.

Constructions C1 and C2 can be generalized to produce an m+1 dimensional watermarking array by using the grid mapping method to map GF($p^m$) onto a p×p×p ... ×p grid by representing each power of a primitive element as an m-tuple. The resultant watermarking array is of size p×p×p×p×($p^m-1$).

The method of connecting elements of GF($p^m$)−{0} with $\mathbb{Z}_{p^m-1}$ using a logarithmic function has an inverse. In one dimension this has led to logarithmic and exponential Costas Array Constructions. Here it leads to even more new multi-periodic multidimensional arrays.

Observe than $Z_p^m-\{0\}$ and $Z_{p^m-1}$ have the same cardinality. Consequently, there exists an inverse function to the one that gives a generic Costas Array, since it is a 1−1 onto function. Consider now the inverse function $g: Z_{p^m-1} \rightarrow Z_p^m-\{0\}$, for the case of the generic Welch Costas Array. We take α, the corresponding primitive element of the finite field.

As in coding theory, we write the elements of GF($p^m$) as m-tuples based on α, a primitive element. $\alpha^1 = (0,0,0,\ldots,1,0)$ $\alpha^2 = (.,.,.,\ldots,.,.,.), \alpha^3 = (.,.,.,.,\ldots,.,.,.), \ldots, \alpha^{p^m-1} = (0,0,0,\ldots,0,1)$ where each m-tuple has entries from $Z_p$. Consequently, the m-tuples define an integer grid in m dimensions, which can be used as a basis for a (m+1)-periodic Costas arrays. $\alpha^i$ can be written as an m-tuple on the grid. Consequently we can take g to be g(h)=$\alpha^i$ for any $i \in Z_{p^m-1}$. Note that g is multi-periodic, and we now see that it has the distinct difference property:

$\forall h \neq 0, \alpha^{i+h} - \alpha^i = \alpha^{j+h} - \alpha^j \Rightarrow i \equiv j$ This is true since $\alpha^{i+h} - \alpha^i = \alpha^i(\alpha^h-1) = \alpha^j(\alpha^h-1) = \alpha^{j+h} - \alpha^j$ Therefore divide by $(\alpha^h-1)$ since $h \neq 0$ and we obtain $\alpha^i = \alpha^j$ which implies i=j.

Definition: An elementary Abelian Costas Array $f: Z_{p^m-1} \rightarrow Z_p^m-\{0\}$ is a 1−1 onto function which is periodic and with the distinctness of differences property. Note that since + and − are the operations of the Abelian Group, we also say this is elementary Abelian.

Construction D1 (Exponential Welch Generalization)

$f(i) = \alpha^i$ is an elementary Abelian Costas Array $f: Z_{p^m-1} \rightarrow Z_p^m-\{0\}$ This is a solitary array.

Construction D2 (Quadratic Generalization—Family of Arrays)

$f_{A,B,C}(i) = A(\alpha^i)^2 + B\alpha^i + C$, $f: Z_{p^m-1} \rightarrow Z_p^m-\{0\}$ where A, B, C are elements of the finite field GF($p^m$), gives a family of arrays. Any two arrays which are multi-dimensional cyclic shifts of one another are called equivalent. The autocorrelation of our arrays and the cross-correlation between any non-equivalent arrays is bounded by two.

Construction D3

With the same assumptions and conclusions as in Construction 2, consider now:

$$f_{A,B,C,D}(i) = \frac{A\alpha^i + B}{C\alpha^i + D},$$

$f: Z_{p^m-1} \rightarrow Z_p^m-\{0\}$ where A, B, C, D are elements of the finite field GF($p^m$). The autocorrelation of our arrays and the cross-correlation between any non-equivalent matrices is bounded by two.

Construction D4(a)

The elements of a finite field together with ∞ can be written in an order determined by Moreno-Maric [O. Moreno and S. V. Maric, A New Family of Frequency-Hop Codes, *IEEE Trans. on Communications*, Vol. 48, 8, August 2000, 1241-1244.] Each of these elements, except ∞ can also be expressed as m-tuple commensurate with the grid described in the preamble to Construction D1. The fractional function of Construction 3 can then be used to map the q+1 entries of {GF($q^m$)∪∞} onto GF($q^m$). Whenever the result is ∞, that entry is left blank. The autocorrelation of these matrices and the cross-correlation between any non-equivalent matrices is bounded by two. We obtain a watermarking array by substituting the coordinates of a grid entry with corresponding cyclic shifts of a commensurate Legendre array.

Construction D4(b)

In a manner similar to Construction 4(a), the entries in $\{GF(q^m)\cup\infty\}$ resulting from the fractional function map of Construction 3 can be mapped onto the multiplicative group $GF(q^m)/0$ by using the log function described before. The autocorrelation of these matrices and the cross-correlation between any non-equivalent matrices is bounded by two. We obtain a watermarking array by substituting the entries on the grid with cyclic shifts of a commensurate Sidelnikov or m-sequence.

Construction D5

In a way similar to previous generalizations, the quadratic of construction 2 can be generalized to a degree n polynomial with coefficients from the finite field. The autocorrelation of these matrices and the cross-correlation between any non-equivalent matrices is bounded by n.

The constructions 2, 3, 4(a) and 5 of matrices with constrained correlation can be converted into watermarking arrays by substituting the grids of shift m' tuples into periodic shifts on a multi-dimensional Legendre array.

Figures 12, 12A, 12B:
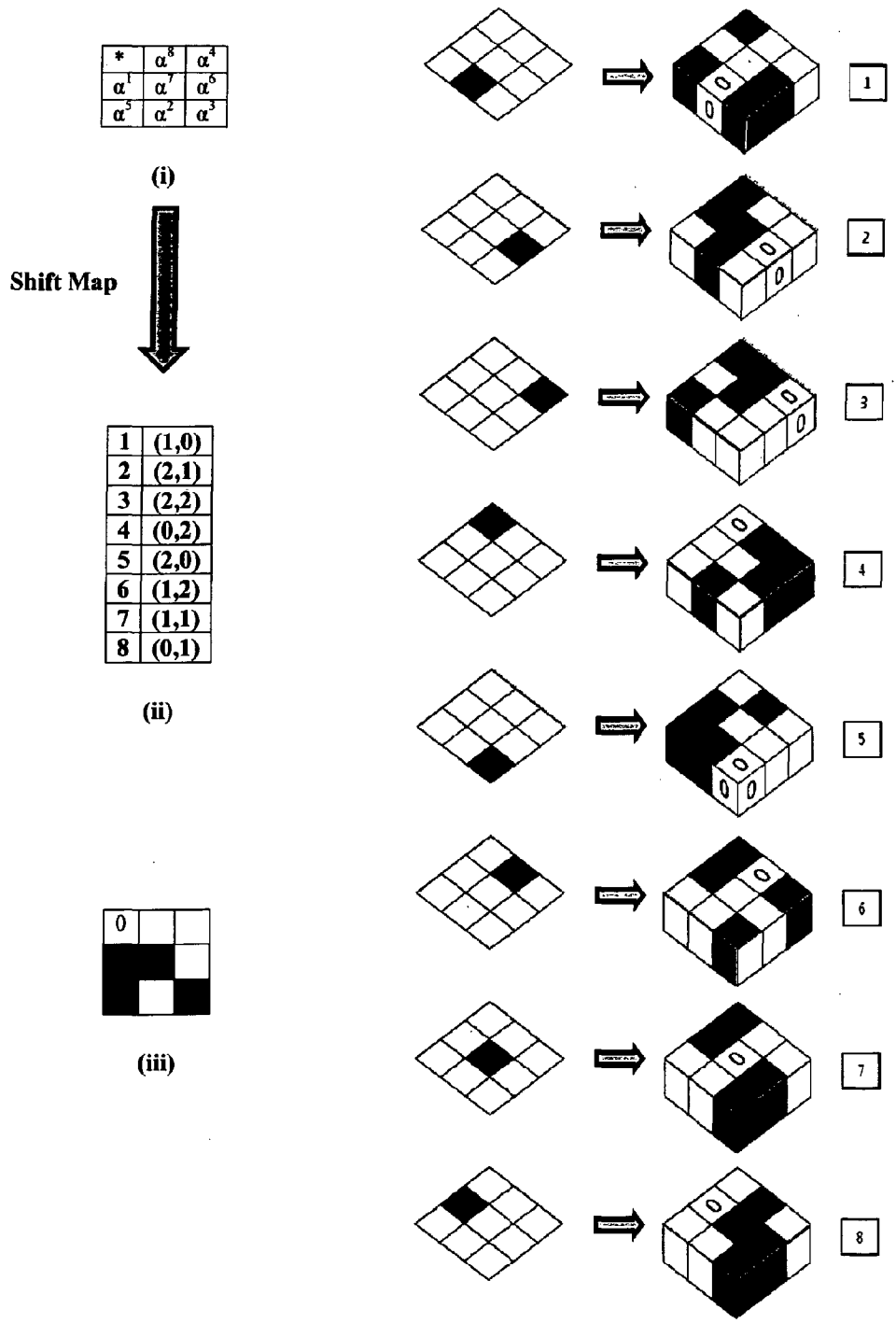
FIG. 12(*a*)(*i*) shows the starting 3*3 grid, as described before.

Construction D1 is illustrated by the example in FIG. 12. FIG. 12(a)(i) shows the starting 3*3 grid, as described before. FIG. 12(a)(ii) shows the inverse mapping, which produces an array of cells containing the two dimensional shifts associated with each entry. FIG. 12 (a)(iii) shows the 3*3 Legendre array constructed by the method described above, and illustrated for a 7*7 array in FIG. 10. FIG. 12(b) shows how each of the two dimensional shifts of FIG. 12(a)(ii) are used to shift the Legendre array of FIG. 12(a)(iii) to produce 8 layers of a three-dimensional array.

Correlation Calculation for Watermarking Array Using Legendre Array Substitution For the constructions D2, D3, D4(a) the correlation takes on the following possible values: $(p^m-1)^2$, $p^m+1$, $+1$, $-p^m+1$. The absolute value of normalized off-peak autocorrelation and cross-correlation is bounded by approximately $p^{-m}$. For three dimensional watermarks, m=2. In general, m is one less than the number of dimensions.

Matrices from Construction 4(b) are converted by substituting the integers $0, 1, \ldots, p^{m-2}$ by a commensurate periodic sequence, such as a Sidelnikov sequence.

Another application of the grid is a four dimensional construction E1, which uses a map from a finite field onto itself. We use the same grid as in Constructions C and Constructions D. Now we apply the following mapping to the powers of $\alpha$ $$f(x) \to Ax^2+Bx+C$$

where x, A, B, C are elements of GF(q) and x is a variable. f(x) is a mapping from GF(q) to GF(q) where $q=p^n$.

Both x and f(x) can be seen as n-tuples using the grid. We obtain a watermarking array by substituting the coordinates of a grid entry with corresponding cyclic shifts of a commensurate multi-dimensional Legendre array.

Figures 13, 13A, 13B:
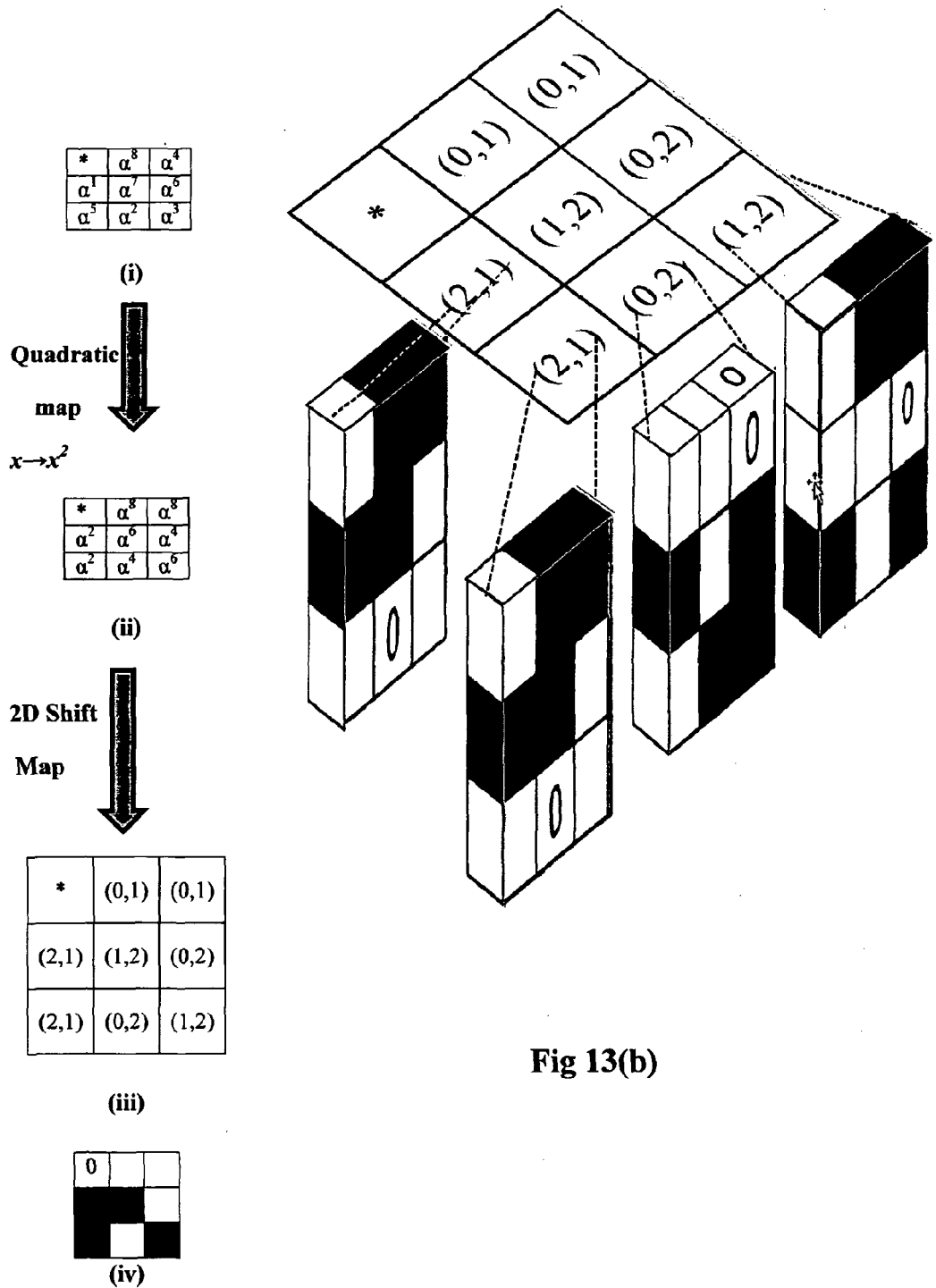
FIG. 13 illustrates the method of this construction.

FIG. 13 illustrates the method of construction E1. FIG. 13(a)(i) shows the starting grid. FIG. 13(a)(ii) shows a simple quadratic map $x \to x^2$ FIG. 13(a)(iii) shows the array of shifts obtained by looking up FIG. 13(a)(i). This array of shifts is then used to cyclically shift a 3*3 Legendre array shown in its (0,0) shift in FIG. 13(a)(iv). The resulting four dimensional array is shown schematically in FIG. 13(b), where only some of the entries are shown. There are 8 shift inequivalent arrays corresponding to 8 quadratics of the type $x \to x^2$ where in this case A is any non-zero element of the finite field $GF(3^2)$. The autocorrelation of each array is bounded by one and the cross-correlation between any pair of the eight arrays is bounded by two.

The constructions in two, three and higher dimensions discussed above are designed for image, video and multimedia watermarking, but may be applied to or adapted to multiple target recognition in radar and optical communications.

Images and video are usually compressed to save on bandwidth or storage capacity. In order to implement the three and higher dimensional arrays of the invention for video watermarking, they may have to be compression resistant.

Video using MPEG compression standard is composed of groups of pictures (GOP). A GOP consists of an I frame and 7 or 11, or 15 prediction frames, depending on the compression setting. A typical GOP is shown in FIG. 14. The I frames, which typically occur twice per second are independent frames, and are best suited to our watermark scheme, although a person skilled in the art could adapt the scheme to embed our watermarks in the B or P frames. B and P frames are encoded with reference to preceding or successive frames, i.e., they are intercoded. P frames are encoded with reference to a previous frame, called forward prediction. B frames are encoded with reference to both the previous frame and the next frame. This is called forward and backward prediction. Use of forward and backward prediction makes a high compression rate possible, because it is necessary to record only the changes from one frame to the next. Therefore the only frames which are not affected by frame to frame compression are the I frames, and any P frames just preceding an I frame. If any other frames were to be watermarked, compression resistance would need to be applied to the method.

Henceforth, we assume that only the I frames are to be watermarked. The I frames are themselves compressed by analysing contiguous 8×8 blocks of the frame using DFT (Discrete Fourier Transform), DCT (Discrete Cosine Transform), or DWT (Discrete Wavelet Transform) transforms, (or custom transforms, e.g. Fractal Transform) depending on the standard. A typical 8×8 frame block, its transform and the readout sequence of the transform is shown in FIG. 15. FIG. 15(a) shows an 8*8 image block, whilst FIG. 15(b) shows the DCT (Discrete Cosine Transform). The size of the dots in the image or the DCT location is proportional to the respective value in the image or its transform. The raster pattern of FIG. 15(b) shows the order in which the DCT components are read out. The arrows between the two blocks indicate the two transforms involved, the DCT and the IDCT (Inverse DCT). Typically, the lowest frequency or scale component in each block (DC value) is not altered in the compression process, and hence this is the component which is easiest to use for our watermark. 1 CIF (Common Intermediate Format) video provides a frame size of 352×288 pixels. This means we can embed a watermark slice which is no greater than about 44×36 in a single I frame.

A possible video watermark implementation could make use of several 7×7×48 blocks in the video to embed our watermarking arrays, corresponding to about 30 seconds of video. If video segments are guaranteed to be longer than 30 seconds, larger arrays could be used. For the size mentioned above, the information capacity of a single array is 10 binary bits. The normalized absolute value of the off-peak autocorrelation, and the cross-correlation between any pair of arrays is less than 1/47. Four arrays could be embedded in a block of video, to represent the serial number of the FPGA. This should fit comfortably into a 40 bit number, whose decimal equivalent is in excess of $10^{12}$. The absolute value of the worst case off-peak correlation is then 5/47, whilst a typical value is much less than that. Another block can be used to hide the time of the video acquisition. For a similar arrangement of four arrays, this represents over 80 thousand years of coverage, with a 1 second resolution. For forensic evidence, it may be required to provide resolution of 0.01 s and that could be achieved with a corresponding reduction of coverage to 800 years. It is possible to embed 28 more such blocks within a video. This corresponds to about 140 ASCII characters, which could hide a proprietary message or whatever the customer required. The information to be embedded could be input via connector 107 in FIG. 2.

The watermarking scheme will remain secure, unless a null image or frame appears. If that were to be watermarked, then, the watermark would be available to a potential adversary. Therefore, the FPGA 102 in FIG. 2 must sense that condition and avoid watermarking the null image.

Another condition of special interest is that of a constant image or frame in a video. The condition of constant frames is frequent in video surveillance, where there is no activity within the field of view for extended periods. Such video must be watermarked. Any data embedded in the video which changes from frame to frame can then become vulnerable to the "collusion attack". A simple example is the averaging attack. An adversary can obtain many frames with the same image content, but different watermarks. The attacker can simply add the pixel values in these frames and divide by N, the number of frames. The watermarks are noise-like, so their addition tends to add as $\sqrt{N}$. Therefore, the watermark strength is reduced as $$\frac{1}{\sqrt{N}}.$$

If N is sufficiently large, the watermarks are reduced below the quantization level and therefore lost. Non-linear attacks, such as max, min, min-max, gradient, etc are even more devastating. The watermark representing time is subject to this phenomenon, and is thus fragile.

It should be noted that watermarks which stay constant are not affected by the attacks described above and are therefore robust. This mixture of robust and fragile watermarks can be useful. For example, if the serial number and proprietary data is recovered, but the time data is not, then this is an indication of a successful attack, or inadvertent tampering.

Since a complete explanation of the first embodiment has been described via a comprehensive example, it is now relevant to mention the rationale of the new watermarking process steps and their benefits. Current watermarking schemes rely on a human operator having access to the unwatermarked (raw) data, and therefore rely on the honesty and vigilance of the operator. Our watermarking process is objective, in the sense that the decision on whether a watermark is present is performed by the camera hardware, with no human intervention. The impartiality of our process provides a means of validating surveillance and security video, making our watermarks admissible evidence. Our unique multidimensional arrays provide a framework for the construction of multidimensional watermarks with great data capacity, suitable for the video surveillance industry and a multiplicity of other applications.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this invention is intended to embrace all alternatives, modifications and variations of the present invention that have been discussed herein, and other embodiments that fall within the spirit and scope of the above described invention.

The invention claimed is:

1. A device for applying a digital watermark to an image, the device comprising:
   a storage element storing programme steps for generating a watermark of two or more dimensions;
   an image sensor that acquires at least one image that is a digital image or converted to a digital image; and
   a processor that combines the at least one image or a sequence of the at least one images and the watermark;
   wherein the watermark is generated by convolving a multi-periodic shift array of dimension two or greater with a balanced periodic substitution sequence or array;
   and wherein the multi-periodic shift array is derived from a polynomial of degree two or greater.

2. The device of claim 1 wherein the watermark is generated by adding a suitable number of watermarking arrays wherein each watermarking array is constructed by convolving a multi-periodic shift array with a balanced periodic substitution sequence, such that the cross-correlation between the said arrays is constrained.

3. A method of applying a digital watermark to at least one digital image including the steps of:
   capturing the at least one digital image;
   generating a watermark by convolving a multi-periodic shift array of dimension two or greater with a balanced periodic substitution sequence or array, wherein the multi-periodic shift array is derived from a polynomial of degree two or greater; and
   encoding the at least one digital image with the watermark.

4. The method of claim 3 wherein the multi-periodic shift array is obtained from an ordered set of powers of a primitive element of a finite field.

5. The method of claim 3 wherein the balanced periodic substitution sequence or array is a Sidelnikov sequence.

6. The method of claim 3 wherein the multi-periodic shift array is obtained by applying a log quadratic map to an ordered set of powers of a primitive element of a finite field.

7. The method of claim 3 wherein the multi-periodic shift array is determined by a polynomial of degree higher than two.

8. The method of claim 3 wherein a two-dimensional shift array is obtained by folding the multi-periodic shift array.

9. The method of claim 3 wherein a two-dimensional shift array is obtained by applying a log quadratic map along two orthogonal axes.

10. The method of claim 4 wherein a two-dimensional shift array is obtained by mapping the elements of the finite field onto an orthonormal basis using a proper subfield and applying a log quadratic map along two orthogonal axes.

11. The method of claim 4 wherein the finite field has base 2 and a one dimensional shift array is used to shift a two-dimensional binary m-array to produce a family of three-dimensional watermarking arrays.

12. The method of claim 3 wherein the multi-periodic shift array is obtained by mapping powers of a primitive element of a finite field $GF(q^n)$ onto a commensurate multi-dimensional grid.

13. The method of claim 3 wherein the multi-periodic shift array is obtained by applying a log quadratic mapping to the elements of a multi-dimensional grid.

14. The method of claim 12 wherein the multi-periodic shift array is obtained by applying a $$\log_\alpha \frac{AX+B}{CX+D}$$

map on the multi-dimensional grid.

15. The method of claim 3 wherein the multi-periodic shift array is obtained by an inverse mapping of the powers (1, 2, ... q") of a primitive element a of a finite field GF(q") onto a multi-dimensional grid, wherein each multi-periodic array on the multi-dimensional grid is substituted by a corresponding multi-periodic shift of a multidimensional Legendre Array.

16. The method of claim 12 wherein the multi-periodic shift array is obtained by applying a quadratic map to the multi-dimensional grid.

17. The method of claim 12 wherein the multi-dimensional shift array is determined by a polynomial of degree higher than two.

18. The method of claim 12 wherein the multi-periodic shift array is obtained by applying a $$f_{A,B,C,D}(i) = \frac{A\alpha^i + B}{C\alpha^i + D}$$

map to the multi-dimensional grid.

19. The method of claim 12 wherein the multi-periodic shift array is obtained by applying a Moreno-Maric map to the multi-dimensional grid.

20. The method of claim 12 wherein the multi-periodic shift array is obtained by applying a Moreno-Maric map followed by a discrete logarithm map to the multi-dimensional grid.

21. The method of claim 12 wherein a two dimensional shift array is obtained by applying a quadratic map from the finite field $GF(p^2)$ onto itself and substituting the entries in the resulting grid by two-dimensional periodic shifts of a two-dimensional Legendre array.

22. A method of identifying a watermarked digital image including the steps of:

receiving a digital image; and detecting if the image contains a watermark by performing a cross-correlation with a set of reference arrays;

wherein the reference arrays are formed by convolving a multi-periodic shift array of dimension two or greater with a balanced periodic substitution sequence or array;

and wherein the multi-periodic shift array is derived from a polynomial of degree two or greater.

23. The method of claim 22 further including the steps of extracting the watermark if present; and comparing the watermark to a database of watermarks to confirm authenticity.

* * * * *